(12) United States Patent
Simone (10) Patent No.: US 10,085,572 B2
(45) Date of Patent: Oct. 2, 2018

(54) DISPLAY CLIP

(71) Applicant: Christopher Simone, Port Washington, NY (US)

(72) Inventor: Christopher Simone, Port Washington, NY (US)

( * ) Notice: Subject to any disclaimer, the term of this patent is extended or adjusted under 35 U.S.C. 154(b) by 0 days.

(21) Appl. No.: 15/485,677

(22) Filed: Apr. 12, 2017

(65) Prior Publication Data

US 2017/0215604 A1 Aug. 3, 2017

Related U.S. Application Data

(63) Continuation of application No. 14/315,205, filed on Jun. 25, 2014, now Pat. No. 9,629,482, which is a continuation of application No. 29/471,310, filed on Oct. 30, 2013, now Pat. No. Des. 714,081, which is a
(Continued)

(51) Int. Cl.
| | |
|---|---|
| *A47F 5/01* | (2006.01) |
| *F16M 13/02* | (2006.01) |
| *F16B 2/24* | (2006.01) |
| *A47G 33/00* | (2006.01) |
| *A63H 17/00* | (2006.01) |
| *A47F 5/06* | (2006.01) |
| *A47F 7/00* | (2006.01) |

(52) U.S. Cl.
CPC .............. *A47F 5/01* (2013.01); *A47G 33/004* (2013.01); *A63H 17/002* (2013.01); *F16B 2/248* (2013.01); *F16M 13/02* (2013.01); *A47F 5/06* (2013.01); *A47F 2007/0092* (2013.01)

(58) Field of Classification Search
CPC .... A47F 5/0006; A47F 5/0018; A47F 5/0043; A47F 5/005; A47F 5/0056; A47F 5/0062; A47F 5/04; A47F 5/06; A47F 5/08; A47F 5/0876; A47F 5/101; A47F 5/103; A47F 5/13; A47F 2007/0092; A47F 5/01; F16B 2/20; F16B 2/205; F16B 2/22; F16B 2/24; F16B 2/248; A47G 33/004; A63H 17/002
USPC ......... 211/87.01, 88.01, 90.01, 90.02, 90.03, 211/90.04, 103, 153, 186, 187, 188, 189, 211/194, 54.1, 57.1, 59.1; 108/106–108, 108/110; 312/183, 247
See application file for complete search history.

(56) References Cited

U.S. PATENT DOCUMENTS

| | | | | |
|---|---|---|---|---|
| 499,608 | A | * | 6/1893 | Taylor ..................... F16B 2/248 248/218.3 |
| 1,227,597 | A | * | 5/1917 | Ellis ......................... B60R 11/00 248/115 |

(Continued)

FOREIGN PATENT DOCUMENTS

GB 309697 A * 4/1929 ............... A47F 5/01

*Primary Examiner* — Joshua E Rodden (57) ABSTRACT

A display clip for supporting an object for display. The display clip includes two bilateral stops terminating in opposing projections wherein the stops are spaced a distance apart, and the opposing projections point substantially in opposite directions. The opposing projections fit removably into channel(s) on a display stand or other support structure, holding the display clip in place. The display clip also comprises one or more catches located at the front of the display clip capable of retaining the object, a plurality of side support members connecting a given stop with a given catch, and one or more crossbars connecting two or more side support members.

16 Claims, 8 Drawing Sheets

Related U.S. Application Data continuation of application No. 13/066,468, filed on Apr. 15, 2011.

(60) Provisional application No. 61/400,132, filed on Jul. 23, 2010.

(56) References Cited

U.S. PATENT DOCUMENTS

| | | | | |
|---|---|---|---|---|
| 1,554,137 A * | 9/1925 | Slifkin | ............... | A47B 57/52 |
| | | | | 108/6 |
| 2,286,831 A * | 6/1942 | Ressinger | ............... | A47F 5/01 |
| | | | | 211/181.1 |
| 3,524,616 A * | 8/1970 | Marschak | ............... | A47B 57/425 |
| | | | | 211/205 |
| 3,528,558 A * | 9/1970 | Williams | ............... | A47F 5/0025 |
| | | | | 211/126.1 |
| 3,774,320 A * | 11/1973 | Folberth, Jr. | ............... | A47F 5/0823 |
| | | | | 248/220.41 |
| 4,133,509 A * | 1/1979 | Kalbow | ............... | A47K 1/09 |
| | | | | 248/221.11 |
| 5,026,011 A * | 6/1991 | Hoefkes | ............... | A47F 5/0823 |
| | | | | 248/220.41 |
| 5,222,608 A * | 6/1993 | Eklof | ............... | A47F 1/128 |
| | | | | 211/54.1 |
| 5,577,699 A * | 11/1996 | Gardner | ............... | A47F 5/0006 |
| | | | | 248/217.2 |
| 6,386,379 B1 * | 5/2002 | Battaglia | ............... | A47B 96/00 |
| | | | | 211/106 |
| 6,564,950 B1 * | 5/2003 | Holm | ............... | A47B 55/02 |
| | | | | 211/106 |
| 2004/0251222 A1 * | 12/2004 | Ohanian | ............... | A47J 47/16 |
| | | | | 211/41.11 |
| 2015/0129518 A1 * | 5/2015 | Ho | ............... | A47J 47/16 |
| | | | | 211/41.2 |
| 2017/0224176 A1 * | 8/2017 | Chu | ............... | A47J 47/16 |

* cited by examiner

DISPLAY CLIP

CROSS-REFERENCE TO RELATED APPLICATIONS

This application is a continuation of U.S. application Ser. No. 14/315,205, filed Jun. 25, 2014, now allowed, which is a continuation of U.S. application Ser. No. 29/471,310 filed Oct. 30, 2013, now U.S. Pat. No. D714,081, issued Sep. 30, 2014, which is a continuation of U.S. application Ser. No. 13/066,468 filed Apr. 15, 2011, now abandoned, which claims the benefit of U.S. provisional patent application Ser. No. 61/400,132 filed Jul. 23, 2010, the contents of each of which are hereby incorporated by reference.

BACKGROUND

This application relates to the field of display clips.

The Pinewood Derby®, or pine car race or pine wood car race, is a popular annual racing event wherein children, with the help of their parent or other adult, build and paint small model cars from wood, usually from kits containing a block of pine, plastic wheels and metal nails as axles. The cars race by gravity power on a track and also are judged for design and originality. The event originated from Cub Scouting, a part of the program of the Boy Scouts of America® (BSA), available to boys from first through fifth grade, or 7 to 11 years of age. The official BSA Pinewood Derby® rules require fixed dimensions for the car's wheelbase and set maximum dimensions for the length, width, height, weight and underbody clearance. With the popularity of the Pinewood Derby® for Cub Scouts, other organizations have developed similar pine car events, sometimes with slightly different rules, including Awana, Christian Service Brigade, Royal Ambassadors, Royal Rangers, Scouts Canada, Woodcar Independent Racing League and YMCA.

Other similar events for Cubs Scouts involving model vehicles are the Raingutter Regatta® and Space Derby®. The Raingutter Regatta® involves racing a handcrafted model sailboat within a water filled channel using lung power. The Space Derby® involves racing a rubber band propelled handcrafted model rocket along a taught cable.

Although not every pine car or other model wins an award, each is considered a trophy in itself. It is a testament to the many hours of hands-on, often painstaking labor and creativity shared by the child and parent or other adult. Naturally, therefore, children are proud to display their vehicles as if displaying a trophy. Of course, the cars can be displayed simply out on a desk, shelf, table or other flat surface. But, as they are not generally designed to be durable—needing to last only a few races—leaving a car casually about could easily result in its damage or destruction. This stems from their repeated or even ordinary handling out of curiosity, for play, to show off, or to move out of the way as they compete for valuable space with other items invariably generated by youth through sports and other activities. In the case of Cub Scouts, moreover, a boy could have built up to five pine cars during the five-year Cub Scout program. Participating in a pine car race, however, is not mandatory and may be prevented in any given year due to lack of time, effort, motivation, opportunity or similar factors. Thus, during his five-year enrollment as a Cub Scout, a boy could make as few as one car and as many as five cars.

There is presently no known display device able to accommodate, in advance, a varying or unknown number of pine cars or similar model vehicles without leaving a fixed component of the display empty in the interim, while at the same time being aesthetically pleasing for household use, compact in dimensions and allowing easy removal of the models while simultaneously showcasing it for maximum viewing effect. Nor is there a known display apparatus incorporating the above features that allows the child to create a pine car or model display that suits their particular style and creativity, while allowing the space for more models to be displayed in future years.

Although several pine car display devices are presently available, none adequately address the considerations stated above. Some of the known displays can accommodate only a single car in a fixed orientation, thus requiring one stand per vehicle. Other displays have a forward tilted flat plane that holds up to three cars, but occupies more flat space than the three cars occupy individually. Thus, these devices are not designed to conserve or maximize space. Moreover, some displays require two mounting screws beneath the car that fit into corresponding notches on the base mounting bracket. In some cases, any metal weight plates affixed to the undercarriage of the pine car that interfere with the screws location would have to be removed to use this stand, thus requiring a modification in the original car. Regardless, the screws necessarily would generate holes in the finished car.

Other known displays avoid the flat display design by being a vertical wall mounted unit. But, the number of cars it can hold is fixed, thus requiring it to be available in different capacities depending on the number of cars to display. Since it can never be known years in advance how many pine cars a youth will build, final display and settling on a particular capacity would have to wait until the child will no longer be involved in the event. In the meantime, the cars accumulate without any formal display, thereby increasing the risk of damage, destruction or loss while decreasing valuable surface space. Moreover, these handcrafted units are plain in design, oriented so only the side of the car can be seen and bulky to the point of overwhelming the showcased pine car.

Some other known devices display objects in a cantilevered orientation that relate to commercial uses only such as the display of merchandise for retail sale, require significant components, are not designed to be discrete or concealed and are not reasonably adaptable to personal or household use to display pine ears or the like in a compact and pleasing manner that makes the car the focus of attention without comprising the appearance of its surroundings.

For example, U.S. Pat. No. 6,315,258 discloses a device that is adapted to carry merchandise on a retail display fixture comprising a rotating base affixed to a special wall unit configured to attract buyers' attention and to secure the item from easy removal. U.S. Pat. No. 5,082,215 discloses a device that is an arm to display product information for sale in a hanging configuration. U.S. Patent Application 2007/0084977 similarly involves a longitudinal display arm, but with welded and bolted connections, designed to be wall mounted and requiring that the model be securely affixed directly to the arm through mounting holes. U.S. Pat. No. 4,217,986 relates to an inventory restraining device for efficiently displaying merchandise in a hanging fashion and for controlling inventory. U.S. Patent Application 2007/0187567 is designed to hang model diecast cars from their rear tires, and so employs substantial retaining springs and other tension devices that would damage a model pine car. U.S. Pat. No. 3,515,284 discloses a device that comprises many components designed to retain tools via the use of direct contact with spring clips. Although within the general field of display devices, none of these patented devices could reasonably showcase a child's pine car or other model vehicle with the above described considerations, nor do they claim to be suited for such.

SUMMARY OF THE INVENTION

The present invention aims to provide a means for displaying pine cars or similar models easily, safely, creatively, efficiently, compactly and pleasingly, regardless of whether the participant knows in advance how many years he or she will participate in the event. In the present invention, a display clip made of formable material having bent projections spaced at a distance apart to accommodate the length of an object and spaced at a distance forward to accommodate the width of an object, as well as forward catches to retain the object and rear bilateral stops, opposing projections and/or apertures for mounting the display clip is described.

The display clip can be affixed with shanked fasteners to any surface or to a display panel with horizontal channels located at intervals to allow easy removal and adjustment of the display clip. The display clip may be formed of resilient, rigid, springable wire or other material capable of achieving the illustrative embodiments and function to cradle for display a pine car or other model vehicle or similar object. The display clip may be used to display the object cantilevered flat or at an angle of inclination depending on the angle in the support members or between the bilateral stops and support members, need only be of a size sufficient to retain the object and is substantially concealed when in use. Display clips can be added as needed to a display stand or other surface and need only be a size sufficient to hold the display clips with the objects.

These and other advantages and novel features of the present invention, as well as the details of the illustrated embodiments thereof, will be more fully understood from the following description and drawings.

BRIEF DESCRIPTION OF THE DRAWINGS

The present disclosure will become more readily apparent from the specific description accompanied by the following drawings, in which.

DETAILED DESCRIPTION OF THE PREFERRED EMBODIMENTS

Embodiments of the invention will be described with respect to the drawings, in which like reference numerals denote like elements.

Figure 1:
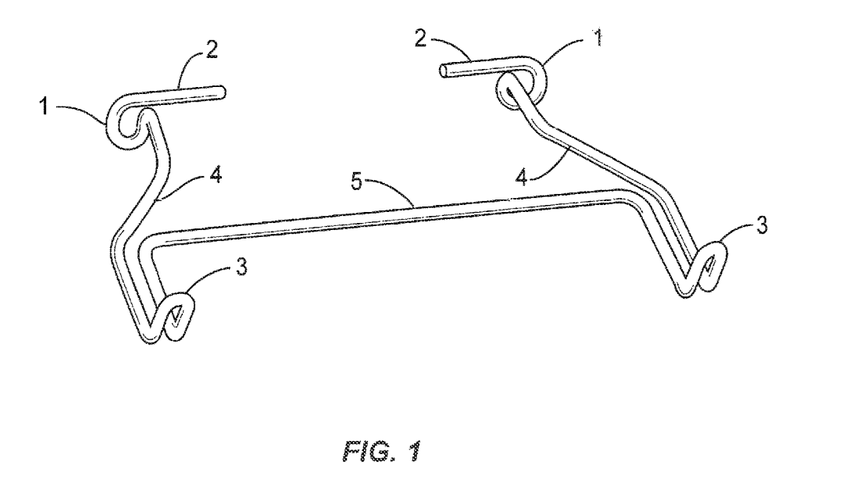
FIG. 1 shows a perspective view of one illustrative embodiment of the present invention, with the bilateral stops formed as apertures and the opposing projections point inward toward each other.
Figure 7:
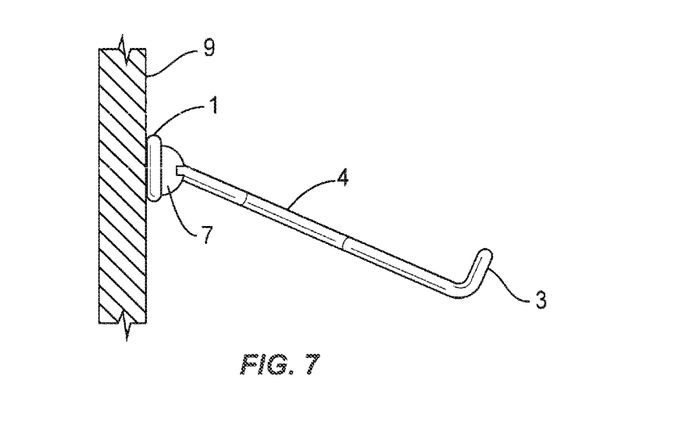
FIG. 7 shows a second embodiment of the present invention as mounted to a surface with screws.

FIG. 1 shows a perspective view of one illustrative embodiment of the display clip. The back of the display clip has a pair of opposing bilateral stops 1 spaced a distance apart. In this illustrative embodiment, the bilateral stops 1 are formed in the shape of loops or apertures. The angle at which the bilateral stops 1 are formed in relation to their connecting side support member 4 establish the display angle of the object being displayed on the display clip. The bilateral stops 1 allow the display clip to be affixed with screws 7 as shown in FIG. 7 or other shanked fasteners to any mounting surface 9 as shown in FIG. 7.

Figure 6:
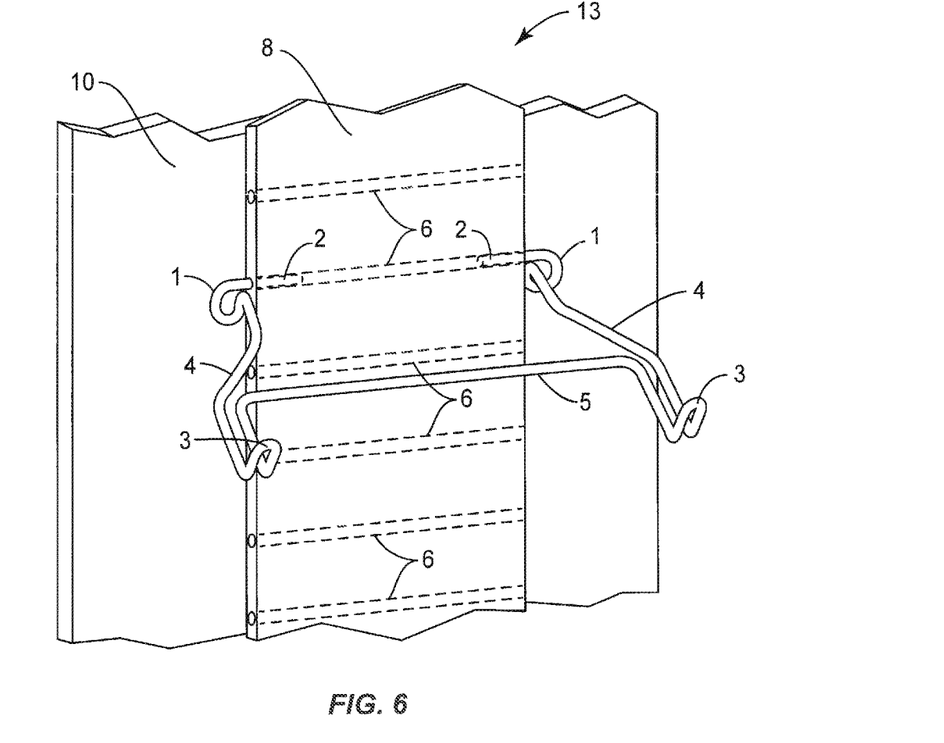
FIG. 6 shows one embodiment of the present invention attached to a display stand.
Figure 8:
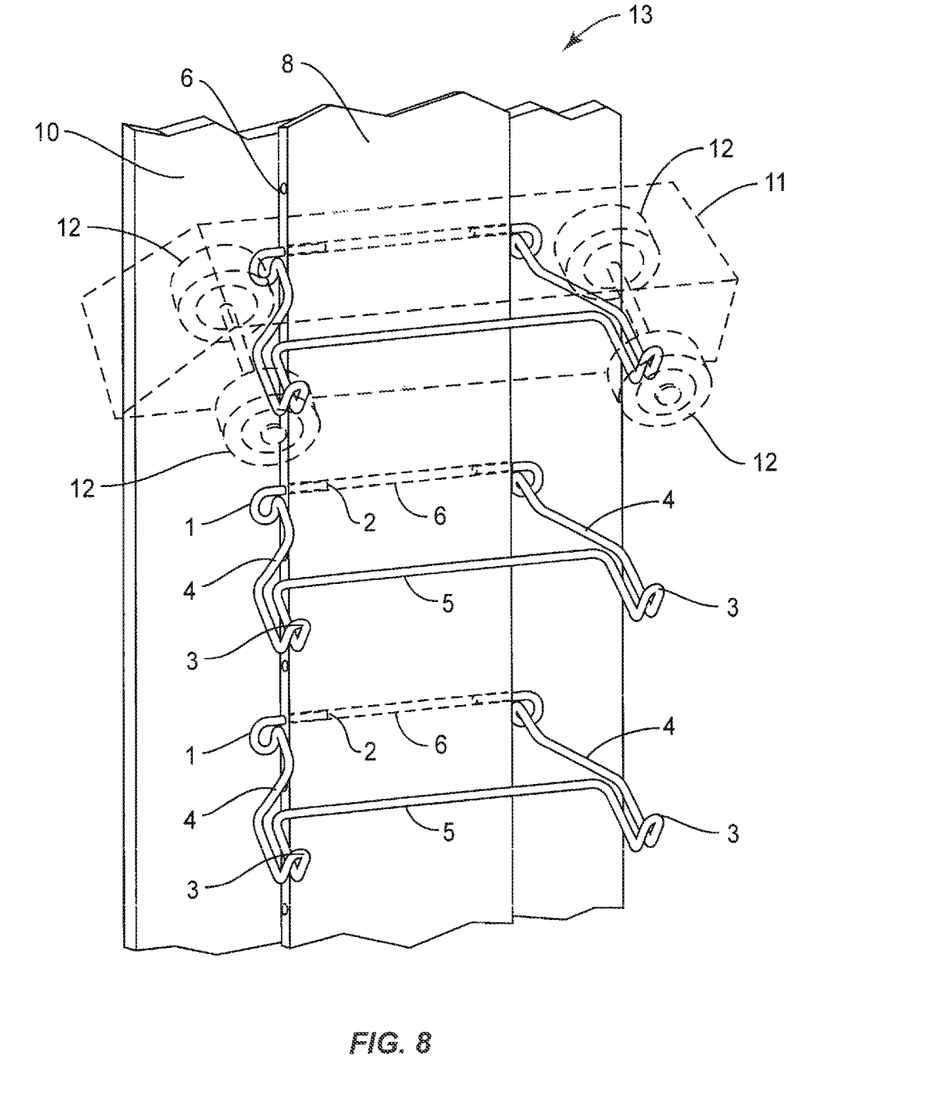
FIG. 8 shows one embodiment of the present invention with multiple display clips attached to a display stand displaying a model vehicle.

The contour of the bilateral stops 1 continue past the top of the bilateral stops 1 and extend towards the center terminating in opposing projections 2 spaced a distance apart from and substantially pointing in opposite directions toward each other. These opposing projections 2 allow the display clip to be affixed without any separate fasteners (e.g. screws 7) to an adjustable display stand 13 as shown in FIG. 6, FIG. 8, FIG. 12, FIG. 13 and FIG. 14. In these illustrative embodiments, the display stand 13 comprises a back panel 10 with a raised strip 8 narrower than the back panel 10, but the width of the space between the closest points between the bilateral stops 1, as shown in FIG. 6 and FIG. 8. The raised strip 8 comprises horizontal channels 6 spaced at intervals. The channel 6 can be a complete bore-through as shown or a slot behind the raised strip 8 or can be a partial bore or slot behind the raised strip 8 in from each side of raised strip 8 to a depth sufficient to accept the opposing projections 2. The vertical distance between the horizontal channels 6 can be varied to accommodate display items of different heights. When affixed as shown in either of these illustrative embodiments, the bilateral stops 1 give the display clip its desired angle of inclination or display angle as it cantilevers from the adjustable back panel 10 or other mounting surface 9. In addition, although the preferred embodiment is described as attaching to the display stand 13, other support structures of like construction are contemplated, e.g., metal railings with appropriate channels.

Figure 3:
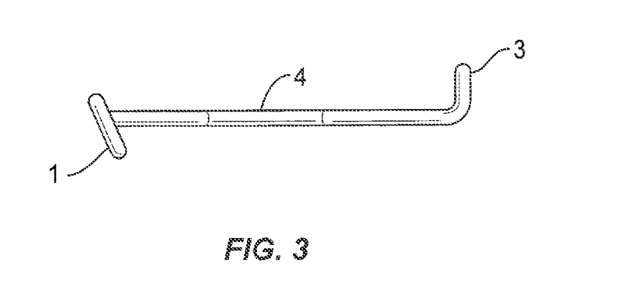
FIG. 3 shows the side view of the present invention illustrated in FIG. 1.
Figure 9:
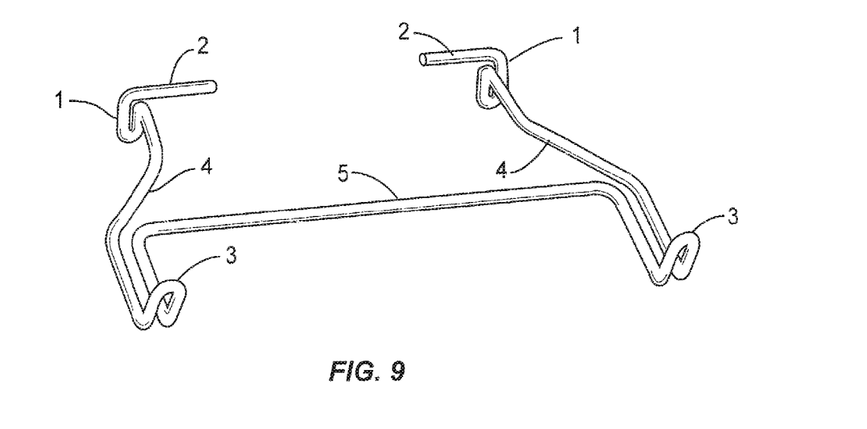
FIG. 9 shows another embodiment of the present invention in which the bilateral stops are closed and contain no apertures, but can still be used in conjunction with a display.
Figure 10:
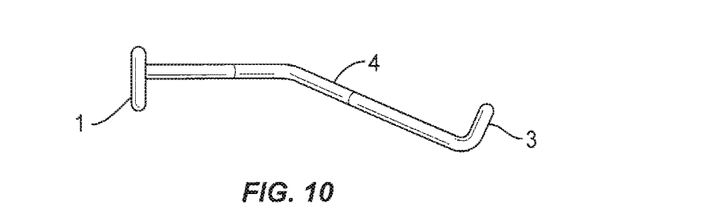
FIG. 10 shows another embodiment of the present invention in which the angle between the side segments and bilateral stops is formed at 90 degrees and the displaying angle is formed by a bend in the side segments.
Figure 11:
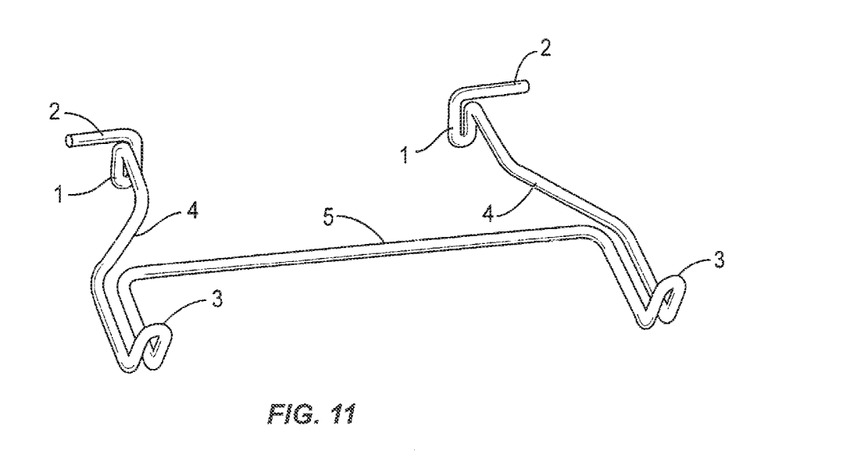
FIG. 11 shows another embodiment of the present invention in which the opposing projections point outward away from each other.

While the illustrative embodiment of FIG. 1 shows the bilateral stops as loops, they may be formed in any shape capable of acting as stops terminating in opposing projections, as described above, including shapes that do not accommodate shanked fasteners (e.g. closed loop or single post directed in a substantially downward direction) if the display clip is to be used with the back panel 10. Likewise, while the illustrative embodiments of FIG. 3 and FIG. 7 show the display angle determined by the angle between the bilateral stops 1 and the side support members 4, the display angle may also be defined by an angle in the side support members 4 with the angle between the bilateral stops 1 and side support members configured at 90 degrees. Similarly, while the illustrative embodiments of FIG. 1 through FIG. 14 show the rear opposing projections 2 pointing inward toward each other, they may point outward away from each other as shown in the illustrative embodiment of FIG. 11 while still performing their function in cooperation with a back panel and raised strip suited to accept projections pointing in the particular opposite direction. Thus, other shapes are contemplated that perform the same function (see e.g. FIG. 9, FIG. 10 and FIG. 11).

In the illustrative embodiment shown in FIG. 1, the front of the display clip has a pair of upward catches 3. These front upward catches 3 are formed at an angle capable of retaining the displayed object from falling off the display clip. When used to cradle and display a model car 11 as shown by the illustrative embodiment in FIG. 8 and FIG. 14, the object touches and rests upon the top surface of the display clip and against the inside of the upward catches 3. When used to cradle and display a model car 11 as shown by the illustrative embodiment in FIG. 8 and FIG. 14, these front upward catches 3 fit within the inside of the car's wheel base and behind the wheels 12 so as to conceal the front upward catches 3 and substantially all of the display clip from view, regardless of which direction the front of the car is facing.

Figure 14:
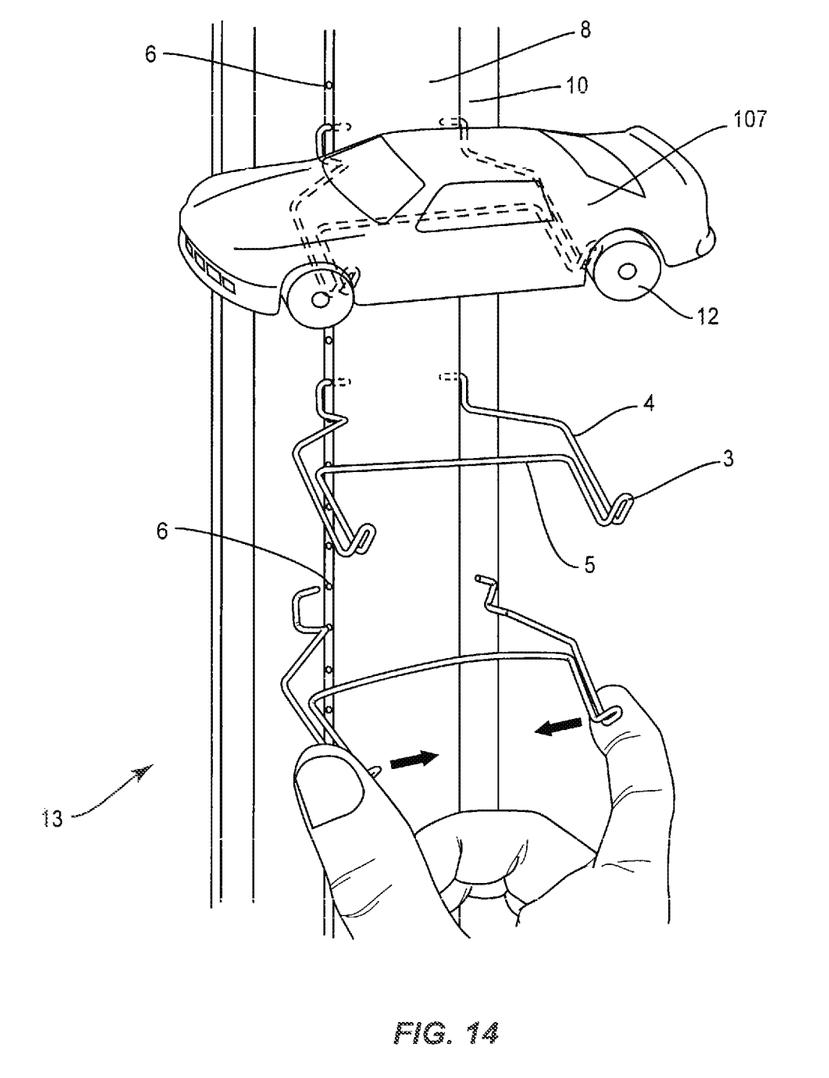
FIG. 14 shows one embodiment of the present invention with multiple display clips attached to display stand, displaying one object and illustrating the method of detaching the adjustable/removable display clips.

The side support members 4 of the display clip connect the front upward catches 3 and the bilateral stops 1 and are shaped to allow the wheels 12 of the model that are adjacent to the bilateral stops 1 as shown by the embodiment in FIG. 8 and FIG. 14 to clear the display clip.

Figure 2:
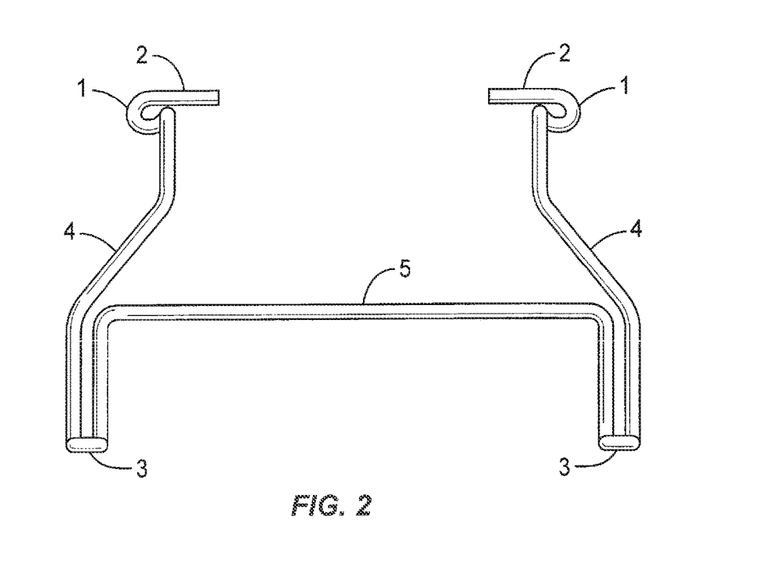
FIG. 2 shows the top view of the present invention illustrated in FIG. 1.

FIG. 2 shows a top view of the display clip illustrated in FIG. 1. As shown in this illustrative embodiment, the display clip is substantially symmetrical from a side to side perspective. A crossbar 5 connects the two symmetrical side support members 4. The crossbar 5 is concealed by the displayed object sitting upon it, as shown in FIG. 8 and FIG. 14. The varying width of objects can be accommodated by lengthening or shortening the crossbar 5, which also allows the front upward catches 3 to rest against any desired location on the object being displayed.

As an example, if the model car 11 shown by the illustrative embodiment in FIG. 8 or FIG. 14 was a Pinewood Derby® car, it would not exceed seven (7) inches in length or three (3) inches in height, the diameter of the wheels 12 would be fixed at one and three-sixteenth (1 3/16) inches, the distance between the center of the wheels 12 (wheelbase) would be fixed at four and three-eighth (4 3/8) inches, the width of the car at its widest point including the wheels 12 would not exceed two and three-quarter (2 3/4) inches and the clearance between the underside of the car and the lowest point on a wheel 12 would be a minimum of three-eighths (3/8) of an inch. Thus, for illustrative purposes, if model car shown in FIG. 8 or FIG. 14 was seven (7) inches long, one and three-quarter (1 3/4) inches high, two and three-quarter (2 3/4) inches wide, with a wheelbase of four and three-eighth (4 3/8) inches and underside clearance of three-eighths (3/8) of an inch, the display clip would have corresponding measurements of four (4) inches between the outermost sides of the front upward catches 3; two and three-quarter (2 3/4) inches from the face of the front upward catches 3 and the back of the bilateral stops 1; the front upward catches 3 would rise three eighths (3/8) of an inch from the bottom of the display clip to remain concealed behind the wheels 12 and inside the axles; and the crossbar 5 would be orientated one and one-eighth (1 1/8) inches on center behind the face of the front upward catches 3 to remain concealed beneath and substantially aligned with the center line of the model vehicle body 11. The distance between the channels 6 would be approximately one-half (1/2) to three quarters (3/4) of an inch to allow incremental adjustment between model cars and to accommodate the maximum allowed height of the model car. These figures are for illustrative purposes, as other vehicle dimensions and display clip dimensions are contemplated.

FIG. 3 shows the side view of the display clip illustrated in FIG. 1. In this illustrative embodiment, the rear bilateral stops 1 are formed to allow the display clip to cantilever from a channeled display component 8 as shown in FIG. 6, FIG. 8, FIG. 12, FIG. 13 and FIG. 14 or mounting surface 9 as shown in FIG. 7 in a forward and downward angle of inclination. In this illustrative embodiment, the front upward catches 3 are formed substantially at a right angle to the side support members 4 of the display clip.

Figure 4:
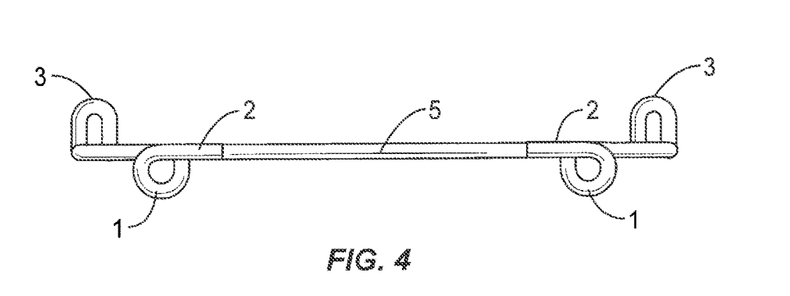
FIG. 4 shows the back view of the present invention illustrated in FIG. 1.

FIG. 4 shows the rear view of the display clip illustrated in FIG. 1. This illustrative embodiment shows the opposing projections 2 terminating from the rear bilateral stops 1 and the orientation of the bilateral stops 1 below the side support members 4 and front upward catches 3 of the display clip.

Figure 5:
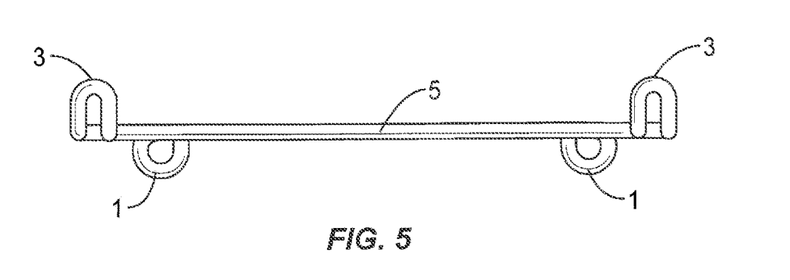
FIG. 5 shows the front view of the present invention illustrated in FIG. 1.

FIG. 5 shows the front view of the display clip illustrated in FIG. 1. This illustrative embodiment shows the front upward catches 3 and their orientation above the top of the bilateral stops 1.

FIG. 6 and FIG. 8 show one illustrative embodiment of the display clip affixed to a stand 13 with the rear opposing projections 2 inserted removably into a raised strip 8 comprising horizontal channels 6, allowing the bilateral stops 1 to act as stops against the stand 13 and the display clip to cantilever off the stand 13. Insertion or removal of the display clip and/or adjusting the spacing between display clips is accomplished by manually separating the rear opposing projections 1 until they clear the channels 6 and width of the raised strip 8, and then inserting the rear opposing projections 1 into matched channels 6 at the desired location, as shown in FIG. 14.

FIG. 7 shows a second embodiment of the display clip from a side view as affixed to a surface 9 with screws 7. Note, any shanked fastener of similar type—such as a nail, hex bolt or rivet—that can pass through and still communicate with a bilateral stop 1 can be utilized to affix the display clip to a surface 9.

Figure 12:
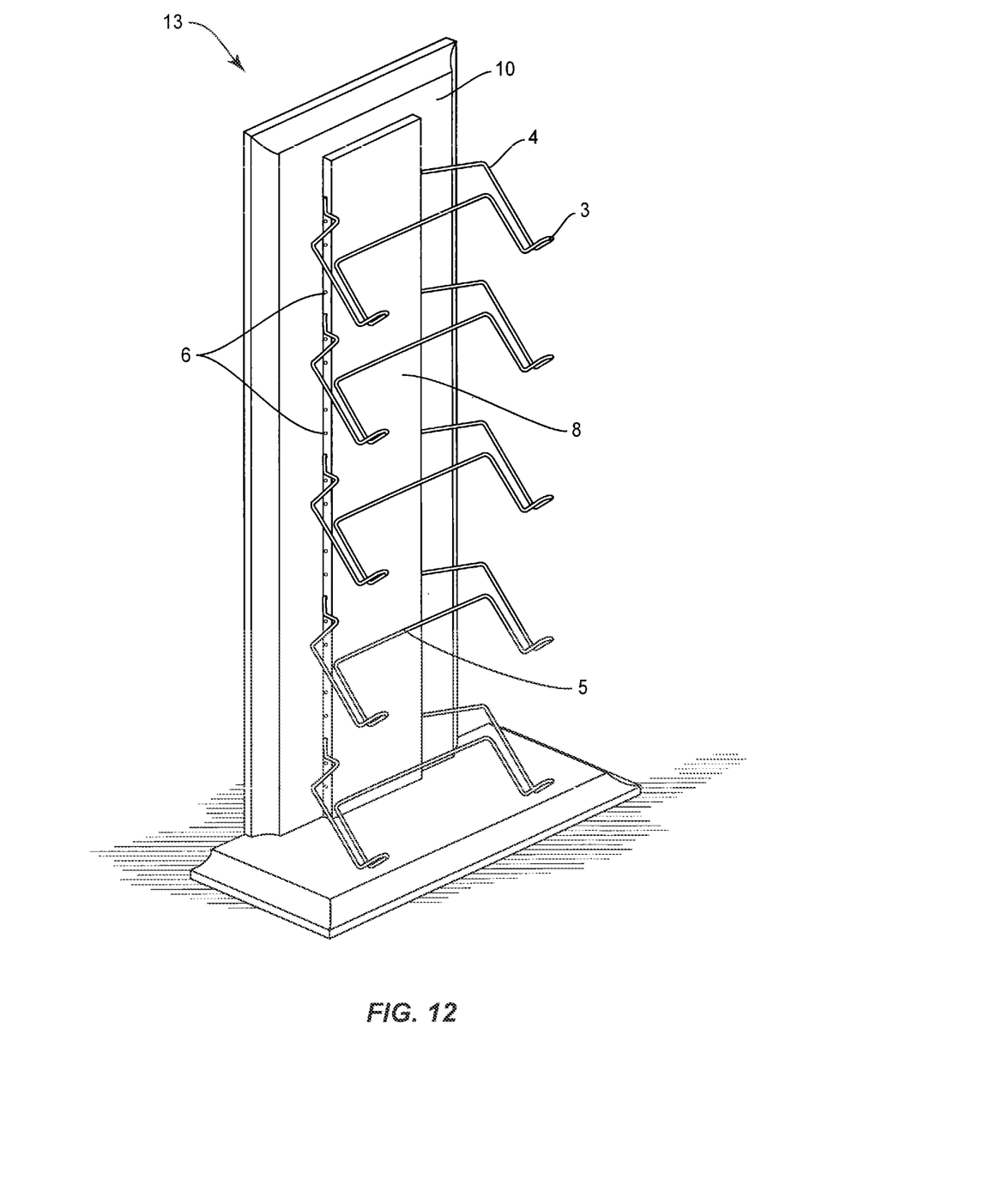
FIG. 12 shows a perspective view of one illustrative embodiment of the present invention with multiple display clips removably attached by their respective opposing projections to a display stand with suitable channels to accept said opposing projections.

FIG. 12 shows a perspective view of one illustrative embodiment of multiple display clips affixed to a stand 13 with the rear opposing projections 2 inserted removably into a raised strip 8 comprising horizontal channels 6, allowing the bilateral stops 1 to act as stops against the stand 13 and the display clip to cantilever off the stand 13.

In this illustrative embodiment, the stand 13 comprises a back panel 10 to the front of which is affixed a raised strip 8 of a width less than the width of the back panel 10 and of a length not exceeding the length of the back panel 10. The raised strip 8 is positioned substantially parallel and along the center of the back panel 10 and extends forward of the front planar surface of the back panel 10 a distance equal to the thickness of the raised strip 8. Along the length of each vertical or longitudinal edge of the raised strip 8 are channels 6 spaced a distance apart into which one or more display clips can be removably attached. Although the display clips are illustrated and described as held in place through the use of the channels 6, other methods of attaching the display clips to the display device 14 are contemplated. For example, display clips designed to receive a screw at the panel end can be used to removably affix the display clips to the display device at preset (i.e. predrilled) or user-determined (i.e. non-predrilled) locations. As another example, the apertures could be positioned in the back panel 10 perpendicular to the planar surface of the back panel 10 with the display clip having ends that extend into the apertures. What is important is that the display clips are affixed to the display device to support an object to be displayed.

In this illustrative embodiment, the display clips are configured at a downward angle maintained by the display clips being cantilevered from the channels 6 in the raised strip 8 and pressing against the back panel 10 with at least one front upward projection 3 to hold a display object in place. Other display clip configurations are contemplated. What is required is the display clip be designed to support the displayed object at its designated position.

Figure 13:
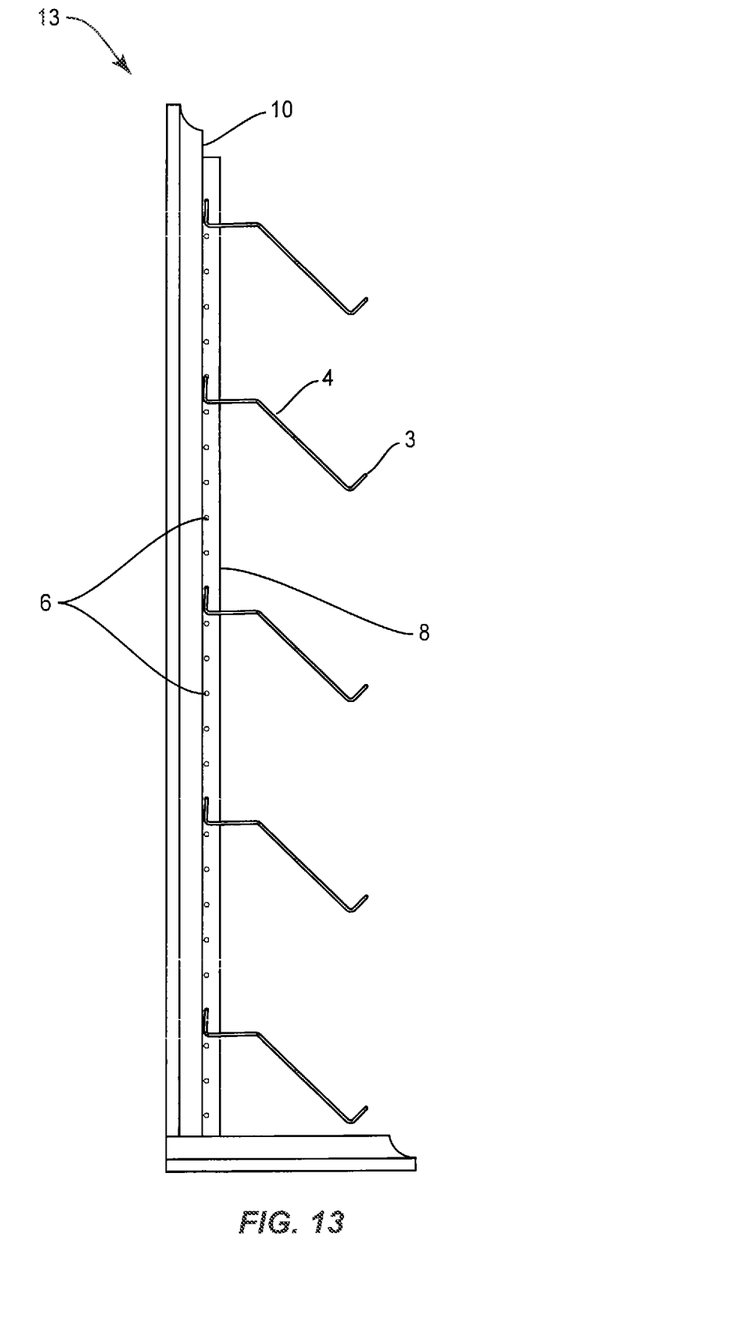
FIG. 13 shows a side view of the present invention illustrated in FIG. 12.

FIG. 13 shows a side view of the display device illustrated in FIG. 12.

FIG. 14 shows a perspective view of a section of the stand 13 illustrated in FIG. 12 and FIG. 13. In this illustrative embodiment, the top display clip is shown in dotted lines to illustrate how a display object 11 rests upon the display clip. In this illustrative embodiment, the middle display clip is partly shown in dotted lines to illustrate how the display clip is removably attached to the channels 6 and cantilevered from the raised strip 8 while pressing against the back panel 10. In this illustrative embodiment, the bottom display clip is shown unattached from the raised strip 8 and illustrates how by squeezing the front upward catches 3 in opposite directions the display clip releases from the channels 6.

Accordingly, the display clip shown and described in the various illustrative embodiments can be used either as affixed to a surface or in conjunction with an adjustable display stand to easily, creatively, efficiently, compactly and pleasingly display a model vehicle or pine car regardless of whether it is known in advance how many years one will participate in the racing event. In the case of Cub Scouts, as few as one and as many as the maximum five cars can be displayed. The flexibility in being able to affix the display clip to a structure other than a stand will stimulate creativity by allowing someone to design and fabricate their own display presentation. In the commercial, institutional or organizational realm, it will also allow for an unlimited and growing number of cars to be similarly showcased, such as in the case of store display wall or a school trophy/awards center.

While the above description contains many specifications, these should not be construed as limitations on the scope of this invention. Many variations are possible by, for example, lengthening or shortening any part of the display clip to suit the object to be displayed. Thus, the scope of the invention should not be determined by the embodiments provided for illustration only, but by the spirit and purpose of the appended claim.

What is claimed is:

1. A display clip for supporting an object for display, comprising:
    two bilateral stops terminating in opposing projections and spaced a distance apart, said opposing projections pointing substantially in opposite directions, each of said bilateral stops extending substantially perpendicular to a respective one of opposing projections, said bilateral stops holding the clip in a cantilevered orientation when attached to a display surface;
    two catches located at a front of said clip and extending upward for retaining said object;
    two side support members, each connecting one of said bilateral stops with one of said catches; and
    a crossbar connected between the two catches and positioned offset from the front of said clip,
    wherein an inward and opposite pressure applied to the two catches causes an outward and opposite movement of the two bilateral stops, and
    wherein an outward and opposite pressure applied to the two catches causes an inward and opposite movement of the two bilateral stops.

2. The display clip of claim 1, wherein an angle between a given bilateral stop and its connecting side support member determines a displaying angle of said object.

3. The display clip of claim 1, wherein an angle in the connecting side support member determines a displaying angle of said object.

4. The display clip of claim 1, wherein each catch is formed at substantially a 90-degree angle to the respective side support member.

5. The display clip of claim 1, wherein said crossbar is positioned such that when said object is displayed on said clip said crossbar is concealed beneath said object.

6. The display clip of claim 1, wherein said clip is made of a resilient material.

7. The display clip of claim 1, wherein a length of each side support member accommodates a width of said object and a length of said crossbar accommodates a length of said object.

8. The display clip of claim 1, wherein said clip can be affixed to the display surface with fasteners communicating with said bilateral stops.

9. The display clip of claim 1, wherein said object is a model vehicle.

10. The display clip of claim 1, wherein the two bilateral stops, the two catches, the two side support members, and the crossbar are formed as a single and continuous unit.

11. A display clip for supporting an object for display, comprising:
    a first and second opposing projections spaced a distance apart, each opposing projection having an inner free end and an outer end;
    a first stop connected to the outer end of the first opposing projection and extending downward and substantially perpendicular to said first opposing projection;
    a second stop connected to the outer end of the second opposing projection and extending downward and substantially perpendicular to said second opposing projection;
    a first side support member, having a first and a second end, connected at said first end to the first stop and extending substantially perpendicular to said first stop;
    a second side support member, having a first and a second end, connected at said first end to the second stop and extending substantially perpendicular to said second stop;
    a first catch connected to said second end of said first side support member and extending upward and substantially perpendicular to said first side support member;
    a second catch connected to said second end of said second side support member and extending upward and substantially perpendicular to said second side support member; and a crossbar connecting said first and second side support members offset from the second ends of said first and second side support members to maintain said distance apart, wherein an inward and opposite pressure applied to the first catch and the second catch causes an outward and opposite movement of the first and second opposing projections, and wherein an outward and opposite pressure applied to the two catches causes an inward and opposite movement of the two bilateral stops.

12. The display clip of claim 11, wherein an angle between each stop and its respective side support member determines a displaying angle of said object.

13. The display clip of claim 11, wherein said clip is made of a resilient material.

14. The display clip of claim 11, wherein said clip can be affixed to a display surface with fasteners communicating with said bilateral stops.

15. The display clip of claim 11, wherein the first and second opposing projections, the first stop, the second stop, the first side support member, the second side support member, the first catch, the second catch, and the crossbar are formed as a single and continuous unit.

16. A method for affixing and removing a display clip for supporting an object for display, the display clip comprising two bilateral stops terminating in opposing projections and spaced a distance apart, said opposing projections pointing substantially in opposite directions, said bilateral stops holding the clip in a cantilevered orientation when attached to a display surface, two catches located at a front of said clip and extending upward for retaining said object, two side support members, each connecting one of said bilateral stops with one of said catches, and a crossbar connected between the two catches and positioned offset from the front of said clip, the method comprising the steps of:

applying inward pressure at or about a proximate end of each side support member to expand a distance between the opposing projections;

aligning the opposing projections with at least one horizontal channel; and releasing the inward pressure to insert the opposing projections into the at least one horizontal channel.

* * * * *